US012561594B2

(12) United States Patent
Ubaru et al.

(10) Patent No.: US 12,561,594 B2
(45) Date of Patent: Feb. 24, 2026

(54) QUANTUM CIRCUITS FOR MATRIX TRACE ESTIMATION

(71) Applicant: International Business Machines Corporation, Armonk, NY (US)

(72) Inventors: Shashanka Ubaru, Ossining, NY (US); Kenneth Lee Clarkson, Madison, NJ (US); Ismail Yunus Akhalwaya, Emmarentia (ZA); Mark S. Squillante, Greenwich, CT (US); Vasileios Kalantzis, White Plains, NY (US); Lior Horesh, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 814 days.

(21) Appl. No.: 17/863,508

(22) Filed: Jul. 13, 2022

(65) Prior Publication Data

US 2024/0020564 A1 Jan. 18, 2024

(51) Int. Cl.
*G06N 10/00* (2022.01)
*G06F 17/16* (2006.01)
*G06N 10/40* (2022.01)

(52) U.S. Cl.
CPC .............. *G06N 10/40* (2022.01); *G06F 17/16* (2013.01); *G06N 10/00* (2019.01)

(58) Field of Classification Search
None
See application file for complete search history.

(56) References Cited

U.S. PATENT DOCUMENTS 9,275,011 B2 3/2016 Svore et al.
9,430,688 B1 8/2016 Ray
(Continued)

FOREIGN PATENT DOCUMENTS

CN 110443785 A 11/2019
CN 110612540 A 12/2019
(Continued)

OTHER PUBLICATIONS

Ubaru, Shashanka et al., "Quantum Topological Data Analysis with Linear Depth and Exponential Speedup," arXiv preprint arXiv:2108. 02811, Aug. 5, 2021, 27 pages (Grace Period Disclosure).
(Continued)

*Primary Examiner* — Xuyang Xia
(74) *Attorney, Agent, or Firm* — SCULLY, SCOTT, MURPHY & PRESSER, P.C.; Erik Johnson

(57) ABSTRACT

Systems and methods for operating a quantum system are described. A controller of a quantum system can generate a command signal. The quantum system can include quantum hardware having a plurality of qubits. An interface of the quantum system can control the quantum hardware based on the command signal to generate a random state vector represented by the plurality of qubits. The random state vector can include a specific number of independent entries. The interface can control the quantum hardware to determine moments of a matrix based on the random state vector. The controller can be further configured to output the moments of the matrix to a computing device to estimate a trace of the matrix using the moments.

25 Claims, 11 Drawing Sheets

(56) References Cited

U.S. PATENT DOCUMENTS

| | | | | |
|---|---|---|---|---|
| 10,311,370 | B2 * | 6/2019 | Bravyi | G06F 17/16 |
| 10,977,546 | B2 | 4/2021 | Gambetta et al. | |
| 11,625,637 | B2 * | 4/2023 | Gidney | H03K 19/20 |
| | | | | 706/62 |
| 12,001,925 | B2 | 6/2024 | Barber et al. | |
| 2007/0036434 | A1 | 2/2007 | Saveliev | |
| 2015/0363708 | A1 | 12/2015 | Amin et al. | |
| 2016/0191060 | A1 * | 6/2016 | McDermott, III | |
| | | | | H03K 19/1958 |
| 2017/0147946 | A1 | 5/2017 | Umeda | |
| 2018/0025073 | A1 | 1/2018 | Singh et al. | |
| 2018/0287788 | A1 * | 10/2018 | Pitalúa García | H04L 9/0852 |
| 2019/0164034 | A1 | 5/2019 | Gambetta et al. | |
| 2020/0265274 | A1 * | 8/2020 | Kachman | G06N 7/01 |
| 2020/0342380 | A1 | 10/2020 | Selina et al. | |
| 2020/0349050 | A1 * | 11/2020 | Ghobadi | G06F 11/3058 |
| 2020/0349459 | A1 | 11/2020 | Cao et al. | |
| 2021/0058244 | A1 | 2/2021 | Jacak et al. | |
| 2021/0089953 | A1 * | 3/2021 | Bocharov | G06N 10/60 |
| 2021/0232960 | A1 | 7/2021 | Scott N. et al. | |
| 2021/0256410 | A1 | 8/2021 | Bravyi et al. | |
| 2021/0256414 | A1 | 8/2021 | Kachman et al. | |
| 2021/0272009 | A1 | 9/2021 | Gidney et al. | |
| 2021/0329601 | A1 | 10/2021 | Li | |
| 2021/0383022 | A1 | 12/2021 | Bennati et al. | |
| 2022/0058435 | A1 | 2/2022 | Ou et al. | |
| 2022/0084398 | A1 | 3/2022 | Zhang et al. | |
| 2022/0172050 | A1 * | 6/2022 | Dalli | G06N 3/047 |
| 2022/0180214 | A1 | 6/2022 | Cervantes et al. | |
| 2022/0299341 | A1 | 9/2022 | Zhang | |
| 2023/0040289 | A1 * | 2/2023 | Sels | G06N 7/01 |
| 2023/0080319 | A1 | 3/2023 | Zhang et al. | |
| 2023/0104188 | A1 | 4/2023 | Zilberman et al. | |
| 2023/0401792 | A1 | 12/2023 | Hofmann | |
| 2024/0020563 | A1 | 1/2024 | Akhalwaya et al. | |
| 2024/0020565 | A1 | 1/2024 | Ubaru et al. | |
| 2024/0022247 | A1 | 1/2024 | Ubaru et al. | |
| 2024/0028939 | A1 | 1/2024 | Akhalwaya et al. | |
| 2024/0037304 | A1 | 2/2024 | Akhalwaya et al. | |
| 2024/0296367 | A1 | 9/2024 | Rubin et al. | |

FOREIGN PATENT DOCUMENTS

| | | | |
|---|---|---|---|
| CN | 112651418 | A | 4/2021 |
| CN | 113204738 | A | 8/2021 |
| WO | 2014/081882 | A2 | 5/2014 |
| WO | 2020164772 | A1 | 8/2020 |
| WO | 2020/263146 | A1 | 12/2020 |

OTHER PUBLICATIONS

Hayakawa, Ryu, "Quantum Algorithm for Persistent Betti Nos. and Topological Data Analysis," arXiv preprint arXiv:2111.00433, Oct. 31, 2021, 25 pages.

Seth Lloyd,"Quantum algorithms for topological and geometric analysis of data." arXiv:1408.3106v2 [quant-ph] Dec. 15, 2015 20 pages https://arxiv.org/abs/1408.3106.

Grover L.K.: A fast quantum mechanical algorithm for database search, Proceedings, 28th Annual ACM Symposium on the Theory of Computing, (May 1996) p. 212-219 https://arxiv.org/abs/quant-ph/9605043.

Hajij, Mustafa et al., "Simplicial Complex Representation Learning," arXiv preprint arXiv:2103.04046, Feb. 22, 2022, 10 pages.

NIST, "NIST Cloud Computing Program", http://csrc.nist.gov/ groups/SNS/cloud-computing/index.html, Created Dec. 1, 2016, Updated Oct. 6, 2017, 9 pages.

Horesh, L., et al., "Quantum Computing Algorithms for Decision Making Under Uncertainty", Jul. 14, 2021, 111 pages (Grace Period Disclosure).

Low, G.H., et al., "Optimal Hamiltonian Simulation by Quantum Signal Processing", arXiv:1606.02685v2, Dec. 20, 2016, 6 pages.

Van Den Berg, E., et al., "Circuit optimization of Hamiltonian simulation by simultaneous diagonalization of Pauli clusters", arXiv:2003.13599v2, Sep. 5, 2020, 28 pages.

Cade, Chris, and Ashley Montanaro. "The Quantum Complexity of Computing Schatten norms." arXiv preprint arXiv:1706.09279 (Jun. 28, 2017). 28 Pages.

Luongo, Alessandro, and Changpeng Shao. "Quantum algorithms for spectral sums." arXiv preprint arXiv:2011.06475 (Nov. 12, 2020). 24 Pages.

Gyurik, Casper, Chris Cade, and Vedran Dunjko. "Towards quantum advantage for topological data analysis." arXiv e-prints (Mar. 1, 2020): arXiv-2005. 29 Pages.

Avron, Haim, and Sivan Toledo. "Randomized algorithms for estimating the trace of an implicit symmetric positive semi-definite matrix." Journal of the ACM (JACM) 58.2 (Apr. 2010): 16 Pages.

Hutchinson, M.F., 1989. A stochastic estimator of the trace of the influence matrix for Laplacian smoothing splines. Communications in Statistics—Simulation and Computation, 18(3), pp. 1059-1076.

Brakerski, Zvika, and Shmueli, Omri "(Pseudo) Random Quantum States with Binary Phase." Theory of Cryptography Conference. Springer, Cham, Jun. 26, 2019, 21 pages.

Fitzsimons, Jack K. et al., "Improved Stochastic Trace Estimation using Mutually Unbiased Bases," arXiv preprint arXiv:1608.00117, Jul. 30, 2016, 5 pages.

Fika, Paraskevi et al., "Estimation of the Bilinear Form y□ f (A) x for Hermitian Matrices," Linear Algebra and its Applications 502, 2016, pp. 140-158. (See article history for dates).

Ubaru, Shashanka, and Yousef Saad. "Fast methods for estimating the numerical rank of large matrices." International Conference on Machine Learning. PMLR, 2016. 10 Pages.

Han, I., Malioutov, D., Avron, H., & Shin, J. (2017). Approximating spectral sums of large-scale matrices using stochastic chebyshev approximations. SIAM Journal on Scientific Computing, 39(4), A1558-A1585. Mar. 9, 2017 30 Pages.

Fan, Li et al., "Spectrum-Adapted Polynomial Approximation for Matrix Functions," arXiv preprint arXiv:1808.09506, Aug. 28, 2018, 5 pages.

Han, Insu et al., "Stochastic Chebyshev Gradient Descent for Spectral Optimization," Advances in Neural Information Processing Systems 31, 2018, 11 pages.

Akhalwaya, Ismail Yunus et al., "Don't Count the Shots, Make the Shots Count: Efficient Quantum Computation of the Fermionic Boundary Operator", arXiv:2201.11510v1, Jan. 27, 2022, 16 pages.

Non-Final Rejection Mailed on Apr. 11, 2025 for U.S. Appl. No. 17/863,449, 8 page(s).

Notice of Allowance and Fees Due (PTOL-85) Mailed on Apr. 10, 2025 for U.S. Appl. No. 17/863,524, 9 page(s).

Non-Final Rejection Mailed on Aug. 22, 2025 for U.S. Appl. No. 17/863,484, 6 page(s).

A Holzner et al., "Chebyshev matrix product state approach for spectral functions", published to Physical Review B 83, 195115, May 10, 2011, 20 pages.

C. Bekas, et al., "An Estimator for the Diagonal of a Matrix", Jun. 1, 2005, 22 pages, https://www-users.cse.umn.edu/~saad/PDF/umsi-2005-082.pdf.

Cortinovis et al., "On Randomized Trace Estimates for Indefinite Matrices with an Application to Determinants", published to Foundations of Computational Mathematics, Jul. 9, 2021, 29 pages.

Costa et al., "Topological data analysis and applications", published via MIPRO, May 22-26, 2017, 06 pages.

Jonnadula et al., "On the moments of characteristic polynomials", Jun. 22, 2021, 26 pages.

Marco Taboga, "Trace of a matrix", Mar. 13, 2019, 04 pages, https://www.statlect.com/matrix-algebra/trace-of-a-matrix.

United States Non-Final Rejection dated Oct. 16, 2025, 17 pages, in U.S. Appl. No. 17/863,554.

* cited by examiner

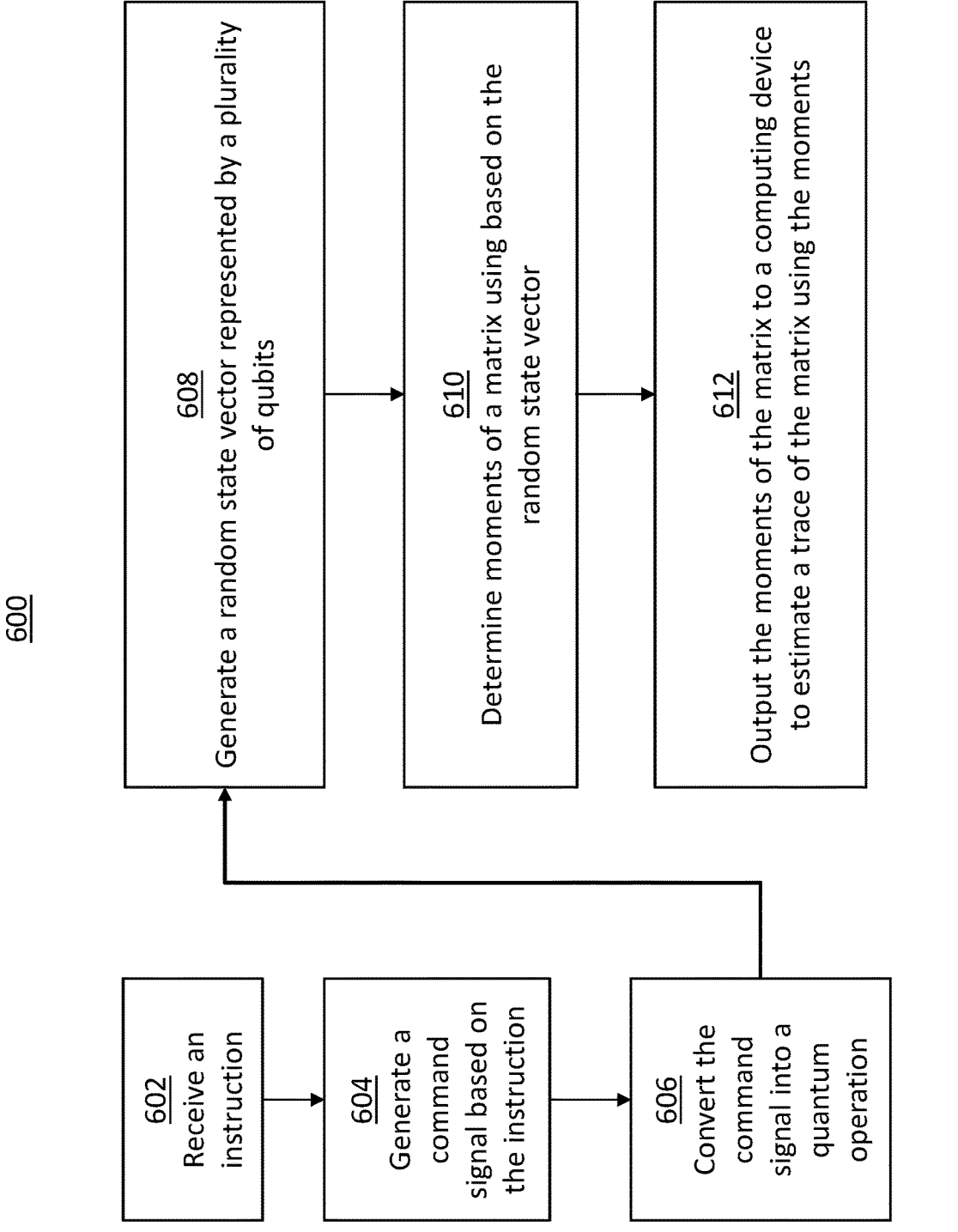

600

602
Receive an instruction

604
Generate a command signal based on the instruction

606
Convert the command signal into a quantum operation

608
Generate a random state vector represented by a plurality of qubits

610
Determine moments of a matrix using based on the random state vector

612
Output the moments of the matrix to a computing device to estimate a trace of the matrix using the moments

Fig. 6

QUANTUM CIRCUITS FOR MATRIX TRACE ESTIMATION

STATEMENT REGARDING FEDERALLY SPONSORED RESEARCH OR DEVELOPMENT

This invention was made with Government support under FA8750-18-C-0098 awarded by U.S. Air Force Research Lab. The Government has certain rights to this invention.

STATEMENT REGARDING PRIOR DISCLOSURES BY THE INVENTOR OR A JOINT INVENTOR

The following disclosure(s) are submitted under 35 U.S.C. 102(b)(1)(A): Quantum Computing Algorithms for Decision Making under Uncertainty, Lior Horesh, Ken Clarkson, Vasileios Kalantzis, Mark Squillante, Shashanka Ubaru, Amir Abboud, July 2021; Quantum Topological Data Analysis with Linear Depth and Exponential Speedup, Shashanka Ubaru, Ismail Yunus Akhalwaya, Mark S. Squillante, Kenneth L. Clarkson, Lior Horesh, arXiv:2108.02811v1, Aug. 5, 2021.

BACKGROUND

The present disclosure relates in general to systems and methods for quantum computing. In particular, the present disclosure provides a quantum system that can estimate a trace of a matrix using log-depth quantum circuits.

Classical computers use transistors to encode information in binary data, such as bits, where each bit can represent a value of 1 or 0. These 1s and 0s act as on/off switches that drive classical computer functions. If there are n bits of data, then there are $2^n$ possible classical states, and one state is represented at a time.

Quantum computers uses quantum processors that operate on data represented by quantum bits, also known as qubits. One qubit can represent the classical binary states '0', '1', and also additional states that are superposition of states '0' and '1'. Due to the ability to represent superpositions of '0' and '1', a qubit can represent both '0' and '1' states at the same time. For example, if there are n bits of data, then $2^n$ quantum states can be represented at the same time. Further, qubits in a superposition can be correlated with each other, referred to as entanglement, where the state of one qubit (whether it is a 1 or a 0 or both) can depend on the state of another qubit, and more information can be encoded within the two entangled qubits. Based on superposition and entanglement principles, qubits can enable quantum computers to perform functions that may be relatively complex and time consuming for classical computers.

SUMMARY

In one embodiment, an apparatus for operating a quantum system is generally described. The apparatus can include a controller configured to generate a command signal. The apparatus can further include quantum hardware including at least a first set of qubits and a second set of qubits. The apparatus can further include an interface connected to the controller and the quantum hardware. The interface can be configured to control the quantum hardware based on the command signal received from the controller to generate a random state vector represented by the plurality of qubits. The random state vector can include a specific number of independent entries. The interface can be configured to control the quantum hardware based on the command signal received from the controller to determine moments of a matrix based on the random state vector. The controller can be further configured to output the moments of the matrix to a computing device to estimate a trace of the matrix using the moments.

In another embodiment, a system for operating a quantum circuit is generally described. The system can include a first computing device configured to process data encoded in binary data and a second computing device configured to be in communication with the first computing device. The second computing device can be configured to process data encoded in qubits. The second computing device can include a controller configured to generate a command signal. The second computing device can further include quantum hardware including at least a first set of qubits and a second set of qubits. The second computing device can further include an interface connected to the controller and the quantum hardware. The interface can be configured to control the quantum hardware based on the command signal received from the controller to generate a random state vector represented by the plurality of qubits. The random state vector can include a specific number of independent entries. The interface can be configured to control the quantum hardware based on the command signal received from the controller to determine moments of a matrix based on the random state vector. The controller can be further configured to output the moments of the matrix to the first computing device to estimate a trace of the matrix using the moments.

In another embodiment, a method for operating a quantum circuit to estimate a trace of a matrix. The method can include receiving, by a controller of a quantum system, an instruction. The method can further include generating, by the controller of the quantum system, a command signal based on the instruction. The method can further include converting, by an interface of the quantum system, the command signal into a quantum operation. The method can further include, based on the quantum operation, controlling, by the interface of the quantum system, quantum hardware of the quantum system to generate a random state vector represented by a plurality of qubits. The method can further include, based on the quantum operation, controlling, by the interface of the quantum system, quantum hardware of the quantum system to determine moments of a matrix based on the random state vector. The method can further include outputting, by the controller of the quantum system, the moments of the matrix to a computing device to estimate a trace of the matrix using the moments.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 6 is a flowchart of an example process that may implement quantum circuits for matrix trace estimation according to an embodiment of the disclosure.

DETAILED DESCRIPTION

Figure 1:
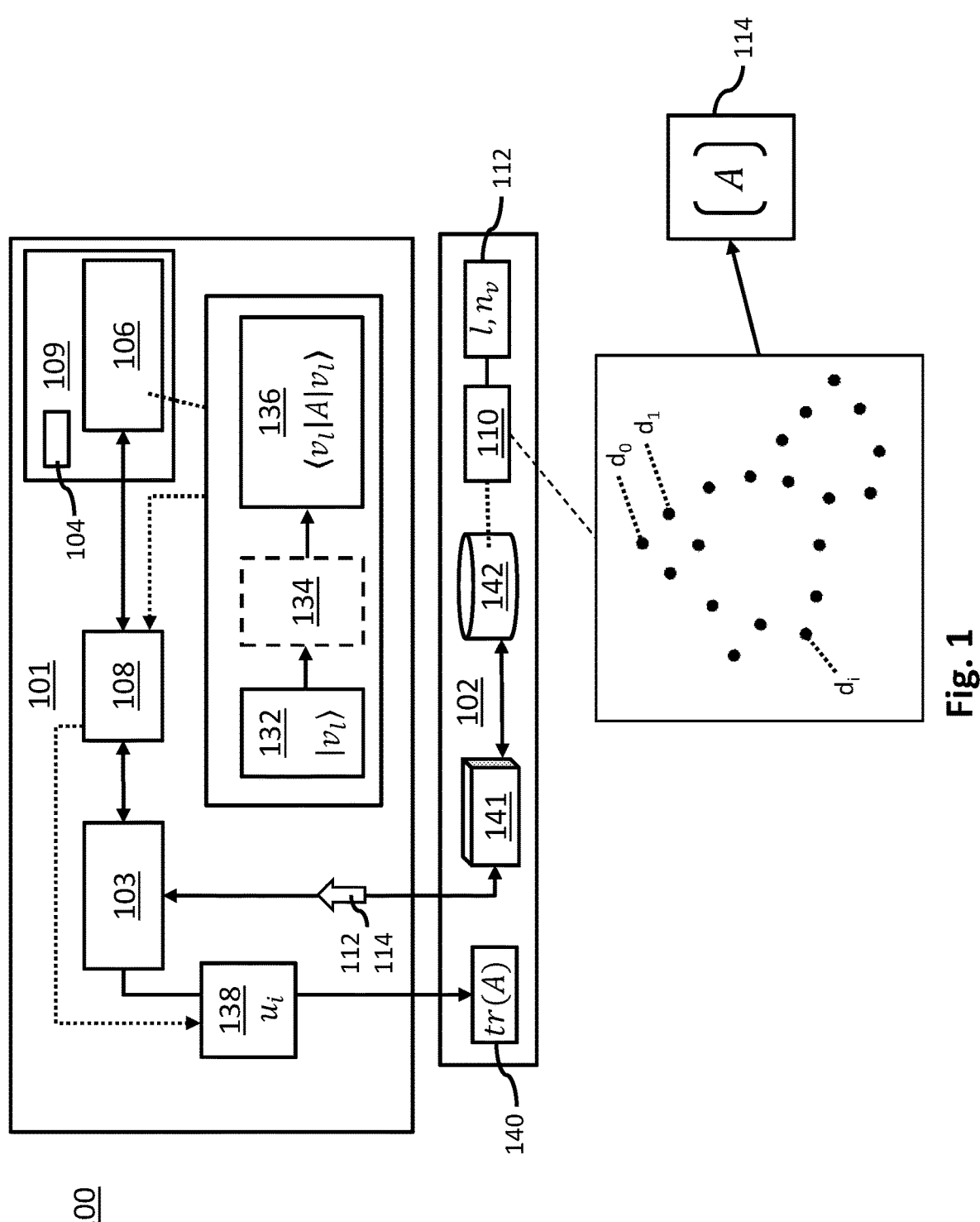
FIG. 1 is a block diagram of an example system for quantum circuits for matrix trace estimation in one embodiment.

The present application will now be described in greater detail by referring to the following discussion and drawings that accompany the present application. It is noted that the drawings of the present application are provided for illustrative purposes only and, as such, the drawings are not drawn to scale. It is also noted that like and corresponding elements are referred to by like reference numerals.

In the following descriptions, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

FIG. 1 is a block diagram of an example system for a short-depth quantum system for quantum circuits for matrix trace estimation in one embodiment. System 100 can be a hybrid computing system including a combination of one or more quantum computers, quantum systems, and/or classical computers. In an example shown in FIG. 1, system 100 can include a quantum system 101 and a classical computer 102. In one embodiment, quantum system 101 and classical computer 102 can be configured to be in communication via one or more of wired connections and wireless connections (e.g., a wireless network). Quantum system 101 can include a quantum chipset that includes various hardware components for processing data encoded in qubits. The quantum chipset can be a quantum computing core surrounded by an infrastructure to shield the quantum chipset from sources of electromagnetic noise, mechanical vibration, heat, and other sources of noise, which tend to degrade performance. Classical computer 102 can be electronically integrated, via any suitable wired and/or wireless electronic connection, with quantum system 101.

In the example shown in FIG. 1, quantum system 101 can be any suitable set of components capable of performing quantum operations on a physical system. A quantum operation can be, for example, a quantum gate operation that manipulate qubits to interact with one another in accordance with the quantum gate operation. In the example embodiment depicted in FIG. 1, quantum system 101 can include a controller 103, an interface 108, and quantum hardware 109. In some embodiments, all or part of each of controller 103, interface 108, and quantum hardware 109 can be located in a cryogenic environment to aid in the performance of the quantum operations. Quantum hardware 109 may be any hardware capable of using quantum states to process information. Such hardware may include a plurality of qubits 104, and mechanisms to couple/entangle qubits 104, in order to process information using said quantum states. Qubits 104 may include, but are not limited to, charge qubits, flux qubits, phase qubits, spin qubits, and trapped ion qubits. Quantum hardware 109 can include a set of quantum gates 106 configured to perform quantum logic operations on qubits stored in quantum registers 104. Quantum gates 106 can include one or more single-qubit gates, two-qubit gates, and/or other multi-qubit gates.

Controller 103 can be any combination of digital computing devices capable of performing a quantum computation, such as executing a quantum circuit 106, in combination with interface 108. Such digital computing devices may include digital processors and memory for storing and executing quantum commands using interface 108. Additionally, such digital computing devices may include devices having communication protocols for receiving such commands and sending results of the performed quantum computations to classical computer 102. Additionally, the digital computing devices may include communications interfaces with interface 108. In one embodiment, controller 103 can be configured to receive classical instructions (e.g., from classical computer 102) and convert the classical instructions into commands (e.g., command signals) for interface 108. Command signals being provided by controller 103 to interface 108 can be, for example, digital signals indicating which quantum gates among quantum gates 106 needs to be applied to qubits 104 to perform a specific function (e.g., matrix trace estimation described herein). Interface 108 can be configured to convert these digital signals into analog signals (e.g., analog pulses such as microwave pulses) that can be used for applying quantum gates on qubits 104 to manipulate interactions between qubits 104.

Interface 108 can be a classical-quantum interface including a combination of devices capable of receiving commands from controller 103 and converting the commands into quantum operations for implementing quantum hardware 109. In one embodiment, interface 108 can convert the commands from controller 103 into drive signals that can drive or manipulate qubits 104, and/or apply quantum gates on qubits 104. Additionally, interface 108 can be configured to convert signals received from quantum hardware 109 into digital signals capable of processing and transmitting by controller 103 (e.g., to classical computer 102). Devices included in interface 108 can include, but are not limited to, digital-to-analog converters, analog-to-digital converters, waveform generators, attenuators, amplifiers, optical fibers, lasers, and filters. Interface 108 can further include circuit components configured to measure a basis of the plurality of qubits following the implementation of quantum gates 106, where measurement can yield a classical bit result. For example, a basis of $|0\rangle$ corresponds to classical bit zero, and a basis of $|1\rangle$ corresponds to classical bit one. Each measurement performed by interface 108 can be read out to a device, such as classical computer 102, connected to quantum system 101. A plurality of measurement results provided by interface 108 can result in a probabilistic outcome Classical computer 102 can include hardware components such as processors and storage devices (e.g., including memory devices and classical registers) for processing data encoded in classical bits. In one embodiment, classical computer 102 can be configured to control quantum system 101 by providing various control signals, commands, and data encoded in classical bits to quantum system 101. Further, quantum states measured by quantum system 101 can be read by classical computer 102 and classical computer 102 can store the measured quantum states as classical bits in classical registers. In one embodiment of an implementation, classical computer 102 can be any suitable combination of computer-executable hardware and/or computer-executable software capable of executing a preparation module 141 to perform quantum computations with data stored in data store 142 as part of building and implementing a machine learning protocol. Data store 142 may be a repository for data to be analyzed using a quantum computing algorithm, as well as the results of such analysis. Preparation module 141 may be a program or module capable of preparing classical data from data store 142 to be analyzed as part of the implementation of a quantum circuit 106. Preparation module 141 may be instantiated as part of a larger algorithm, such as a function call of an application programming interface (API) or by parsing a hybrid classical-quantum computation into aspects for quantum and classical calculation. As described in more detail below, preparation module 141 may generate instructions for creating a quantum circuit 106 using quantum gates 106. In an embodiment, such instructions may be stored by controller 103, and may instantiate the execution of the components of interface 108 so that the quantum operations of the quantum gates 106 may be executed on quantum hardware 109.

Components of classical computer 102 are described in more detail below with reference to FIG. 7. In an example system, classical computer 102 can be a laptop computer, a desktop computer, a vehicle-integrated computer, a smart mobile device, a tablet device, and/or any other suitable classical computing device. Additionally or alternatively, classical computer 102 may also operate as part of a cloud computing service model, such as Software as a Service (SaaS), Platform as a Service (PaaS), or Infrastructure as a Service (IaaS). Classical computer 102 may also be located in a cloud computing deployment model, such as a private cloud, community cloud, public cloud, or hybrid cloud. Aspects of this embodiment are described in more detail below with reference to FIG. 10 and FIG. 11.

System 100 can be implemented to estimate a trace of any input Hermitian matrix, denoted as A, that has a quantum representation. A Hermitian matrix is a square matrix that is self-adjoint, where self-adjoint means the Hermitian matrix is equal to its own conjugate transpose. For example, in the Hermitian matrix, the element in the i-th row and j-th column is equal to the complex conjugate of the element in the j-th row and i-th column, for all indices i and j. In an aspect, determination of the trace of a relatively large matrix can be challenging if a quantum circuit is given for representing the large matrix but its entries and/or eigenvalues are inaccessible (e.g., entries or eigenvalues being unknown, or are not given). Applications that process such large matrices may implement system 100 for trace estimation without a need to simulate an entire Hermitian matrix.

In an aspect, noisy intermediate-scale quantum (NISQ) processors are quantum processors that include approximately fifty to a few hundred qubits, but might not reach fault-tolerance. NISQ algorithms can be algorithms designed for NISQ processors, and can be hybrid algorithms that use NISQ processors but with reduced calculation load by implementing some parts of the algorithms in classical processors. System 100 described herein is NISQ compatible, and can utilize a relatively short depth quantum circuit to estimate a trace of a Hermitian matrix without its entries and/or eigenvalues being accessible. Hence, fault-tolerance quantum computers may not be required.

The NISQ compatible trace estimation implemented by system 100, as described herein, can be used for various applications that can utilize trace estimation for a Hermitian matrix with a given quantum representation with its entries or eigenvalues being inaccessible. Other applications that may implement system 100 for trace estimation can include, but are not limited to, determination and/or approximation of a rank of the given matrix A (e.g., rank(A)), determination of a log-determinant of the given matrix A (e.g., log-det(A)), determination of Schatten p norms of the given matrix A (e.g., $\|A\|_p$), determination of a trace of a matrix inverse (e.g., trace($A^{-1}$), determination of Betti numbers of a simplicial complex (e.g., count number of triangles in a graph or simplicial complex), determination of an Estrada index of a graph (e.g., trace(exp(A)) or trace($e^A$)), determination of a Von-Neumann entropy of a matrix trace (e.g., A log(A)), determination of a spectral density of the given matrix A, and/or various other applications that includes trace estimation of a given matrix.

Quantum computing offers the potential of exponential speedups for certain classical computations. In an aspect, quantum machine learning (QML) algorithms have been proposed as candidates for such exponential improvements. One type of data analysis that may benefit from quantum computing is Topological Data Analysis (TDA). In an aspect, TDA can consume massive datasets and reduce them to a handful of global and interpretable signature numbers, laden with predictive and analytical value. One of the possible application of system 100, as mentioned above, is determination of Betti numbers of a simplicial complex. In an aspect, the determination of Betti numbers can be a process in Topological Data Analysis (TDA). TDA can benefit from quantum computing because TDA can consume massive datasets and TDA can include reducing these massive datasets to a handful of global and interpretable signature numbers, laden with predictive and analytical value.

In one embodiment, data store 142 may include a dataset 110 including a plurality of data points, such as n data points ranging from $d_0, \ldots d_{n-1}$. The plurality of data points can be represented by one or more matrices, such as an input matrix 114 (e.g., an n×n matrix) denoted as A. In one embodiment, input matrix A can be a Hermitian matrix. In embodiments where system 100 is being implemented for TDA applications, input matrix A can be a restricted Laplacian of dataset 110 corresponding to simplices of a specific order k (e.g., k-simplices) in a simplicial complex representing a topology of dataset 110. The trace of input matrix A can be used for various applications, such as determination of a k-th Betti number (e.g., a number of k-simplices) of the simplicial complex for TDA applications.

System 100 can be implemented to estimate a trace of input matrix A without its entries and/or eigenvalues being accessible. Classical computer 102 can generate and provide one or more parameters 112 to quantum system 101. In one embodiment, parameters 112 can include $n_v$ n-bit random binary numbers denoted as $n_v$, and a value l, where $l=1, \ldots, n_v$. Quantum system 101 can use the $n_v$ n-bit random binary numbers to generate a set of random state vectors, denoted as $|v_1\rangle$. In one embodiment, the $n_v$ n-bit binary numbers can be used for generating $n_v$ random Hadamard vectors needed for the trace estimation.

Each one of random state vectors $|v_l\rangle$ can be a superposition of mixed states, which is a superposition of multiple states with different Hamming weights. For example, a random state vector $|v_l\rangle$ corresponding to a vector with four elements can include sixteen states, and these sixteen states can include a mixture of states having a Hamming weight of two (e.g., $|0011\rangle$, $|1010\rangle$, etc.) and three (e.g., $|1011\rangle$, $|1101\rangle$, etc.). The parameter $n_v$ can be an input provided by classical computer 102 to quantum system 101. Further, each one of the random state vectors (e.g., each l-th random state vector $|v_l\rangle$) can include a specific number of independent entries.

Each one of the random state vectors (e.g., each l-th $|v_l\rangle$) can include a specific number, denoted as t, of independent entries such that random state vector $|v_l\rangle$ can be a t-wise independent vector. Random state vector $|v_l\rangle$ being a t-wise independent vector can indicate that that if any t entries are randomly selected from $|v_l\rangle$, then the selected entries are independent from each other. Note that if more than t entries are selected, then the selected entries may not be necessarily independent from each other. In one embodiment, the number t can be four (e.g., t=4) such that each one of the random state vectors (e.g., each l-th $|v_l\rangle$) can be a 4-wise independent vector. Utilization of the random state vector $|v_l\rangle$ with four-wise independent entries may be sufficient to estimate the trace of input matrix A and can avoid a need to simulate a complete Hermitian matrix or sample vectors with random independent and identically distributed entries.

For n=4 (e.g., dataset 110 having four data points), there can be sixteen possible quantum states with equal probability, where the quantum states in $|v_l\rangle$ can be binary (e.g., ranging from $|0000\rangle$ to $|1111\rangle$). If any random four entries are selected, then the selected entries will be one of the sixteen possible states (e.g., $|0000\rangle$ to $|1111\rangle$). In an aspect, if random state vectors $|v_l\rangle$ have at least 4-wise independent entries, an expectation of input matrix A can be equivalent to the trace of A, and a variance of the trace estimation can be relatively low. Further, if system 100 can tolerate an error of up to $\epsilon$, then $$n_v > \frac{1}{\epsilon^2}$$

if random state vectors $|v_l\rangle$ have at least 4-wise independent entries.

Quantum gates 106 can include gates that form one or more quantum circuits 132, 134, 136. Quantum circuit 132 can be configured to generate the random state vectors $|v_l\rangle$. Interface 108 can be configured to control quantum circuits 132, 134, 136 based on a command signal received from controller 103. In one embodiment, interface 108 can control quantum circuits 132, 134, 136 by applying quantum gates (e.g., among quantum gates 106) being used for forming quantum circuits 132, 134, 136 on qubits 104. In one embodiment, quantum circuit 132 can sample random state vectors $|v_l\rangle$ from a $2^n \times 2^n$ Hadamard matrix. For example, a set of n qubits, with initial state $|0\rangle$, among qubit register 104 can be assigned to hold or represent elements of a vector with n elements. Quantum circuit 132 can randomly invert or flip the n qubits (e.g., by applying NOT gates), and apply Hadamard gates to all n qubits to produce a state vector corresponding to a random column of the $2^n \times 2^n$ Hadamard matrix. The produced state vector can be assigned as the l-th random state vector $|v_l\rangle$.

In another embodiment, quantum circuit 132 can be a quantum t-design circuit configured to generate random state vectors $|v_l\rangle$ by generating pseudo-random states. In an aspect, a quantum t-design is a probability distribution over quantum states which cannot be distinguished from the uniform probability distribution over all quantum states (e.g., the Haar measure) if t copies of a state are given from this probability distribution. Quantum circuit 132, when implemented as a quantum t-design circuit, can output a state (e.g., pseudo-random state) that is indistinguishable from states drawn from a random Haar measure. In an aspect, quantum t-design circuits can be considered as being equivalent to t-wise independent vectors in the classical computing.

In one embodiment, quantum circuit 134 can be an application specific quantum circuit that can be inserted between quantum circuits 132, 136. For example, if system 100 is being implemented for Betti number determination in TDA applications, quantum circuit 134 can be inserted for generating a Laplacian $\Delta_k$ based on random state vectors $|v_l\rangle$, and the Laplacian $\Delta_k$ can be assigned as the input matrix 114 (e.g., $A=\Delta_k$).

Quantum circuit 136 can be configured to determine moments $\mu_l$ of input matrix 114 (e.g., input matrix A) using the following representations:

$$\mu_l = \langle v_l | A | v_l \rangle = \langle v_l | i \rangle$$

where $|\phi_l\rangle$ is a quantum state that represents an application of matrix A to $|v_l\rangle$ (e.g., $|\phi_l\rangle = A|v_l\rangle$), and $\langle v_l |$ denotes the inverse or the complex conjugate of the random state vector $|v_l\rangle$. In one embodiment, quantum circuit 136 can be implemented to determine the quantum state $|\phi_l\rangle$ and the complex conjugate $\langle v_l |$, then determine an inner product $\langle v_l | \phi_l \rangle$ of the quantum state and the complex conjugate to determine the moments $\mu_l$.

In embodiments where system 100 is being implemented for TDA and input matrix A is a Laplacian $\Delta_k$, quantum circuit 136 can be configured to determine the moments $\mu_l$ of $\Delta_k$ using the following representations:

$$\mu_l = \langle v_l | \Delta_k | v_l \rangle = \langle \phi_l | \phi_l \rangle = \| |\phi_l\rangle \|^2$$

where $|\phi_l\rangle$ is a quantum state that represents an application of the Laplacian $\Delta_k$ to $|v_l\rangle$ (e.g., $|\phi_l\rangle = \Delta_k |v_l\rangle$), $\langle \phi_l |$ denotes the inverse or the complex conjugate of the quantum state $|\phi_l\rangle$, and $\| |\phi_l\rangle \|^2$ denotes the norm of the quantum state $|\phi_l\rangle$. In one embodiment, quantum circuit 136 can be implemented to determine the quantum state $|\phi_l\rangle$ and the complex conjugate $\langle \phi_l |$, then determine an inner product $\langle \phi_l | \phi_l \rangle$ of the quantum state and the complex conjugate to determine the moments $\mu_l$. In another embodiment, quantum circuit 136 can be implemented to determine the quantum state $|\phi_l\rangle$ and the norm $\| |\phi_l\rangle \|^2$ of the quantum state to determine the moments $\mu_l$. Since the state vector is of exponential size $2^n$, a repeated counting technique may be implemented to estimate the norm $\| |\phi_l\rangle \|^2$.

Interface 108 can estimate or measure outputs of quantum circuit 136, and the measured outputs can be the moments 138 denoted as $\mu_l$. Quantum system 101 can send the moments 138 to classical computer 102. Classical computer 102 can average the moments 138 over the $n_v$ samples to estimate a trace 140 of input matrix A. For example, a trace of input matrix A can be estimated by averaging moments of input matrix A over the $n_v$ samples:

$$\text{trace}(A) \approx \frac{1}{n_V} \sum_{l=1}^{n_V} \langle v_l | A | v_l \rangle$$

Figure 2:
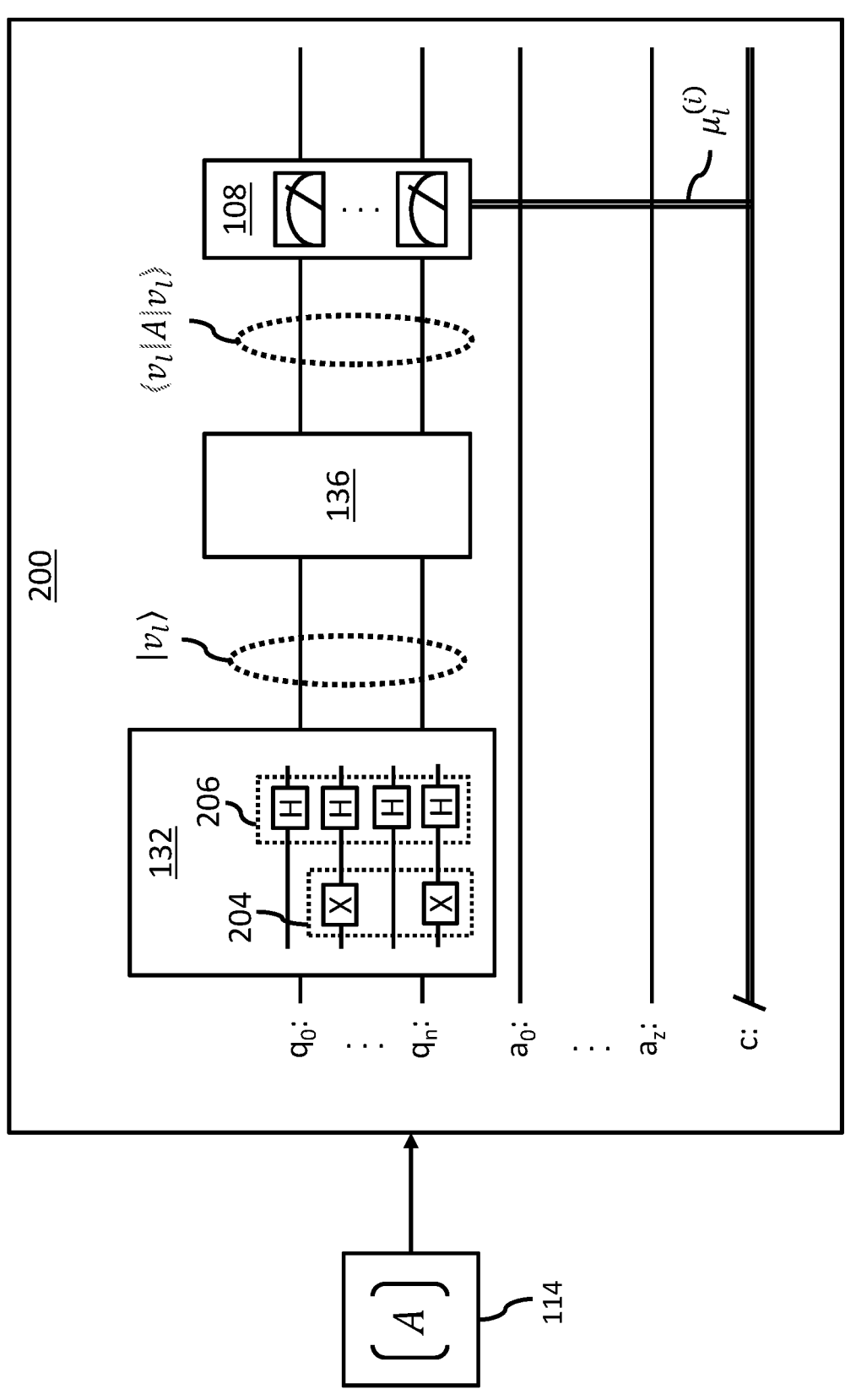
FIG. 2 is a diagram illustrating an example quantum circuit that can be implemented as quantum circuits for matrix trace estimation in one embodiment.

FIG. 2 is a diagram illustrating an example quantum circuit 200 that can be implemented as quantum circuits for matrix trace estimation in one embodiment. Quantum circuit 200 can be formed by at least quantum circuits 132, 136 and interface 108 as shown in FIG. 1. In one embodiment, quantum circuit 200 can receive input matrix 114 from classical system 101 (see FIG. 1). In embodiments where quantum circuit 200 is implemented f or TDA applications, quantum circuit 134 (see FIG. 1) can be inserted between quantum circuits 132, 136 for generating the Laplacian $\Delta_k$ of dataset 110 instead of using input matrix A as input matrix 114. Quantum circuit 200 can operate on n qubits (e.g., $q_0, \ldots q_n$) and/or z ancilla qubits (e.g., $a_0, \ldots a_z$). Quantum circuit 200 can be implemented to estimate a trace of input matrix A. Quantum circuit 132 can be a relatively short-depth circuit configured to generate random state vectors $|v_l\rangle$ by sampling random state vectors $|v_l\rangle$ from a $2^n \times 2^n$ Hadamard matrix. The n qubits can be initialized to state $|0\rangle$, and can be assigned to hold or represent elements of a vector with n elements. Quantum circuit 132 can randomly invert or flip the n qubits using a set of quantum NOT gates 204. One or more qubits among the n qubits can be randomly selected (e.g., by classical system 101) to be inverted, and one or more NOT gates among the set of NOT gates 204 can be used for inverting the randomly selected qubits. Quantum circuit 132 can further apply a set of Hadamard gates 206 to all n qubits, including the inverted qubits, to produce random state vectors $|v_l\rangle$. The produced $|v_l\rangle$ can correspond to a random column of a $2^n \times 2^n$ Hadamard matrix, and can be assigned as the l-th random state vector $|v_l\rangle$. When the random state vector $|v_l\rangle = |h_{c(l)}\rangle$ is some random Hadamard column with c(l) defining the random index, then the estimate $\langle h_{c(l)} | A | h_{c(l)} \rangle$ can be viewed as a uniform random sample of the transformed matrix $M = HAH^T$ with the Hadamard matrix H, i.e., $\langle h_{c(l)} | A | h_{c(l)} \rangle = \langle e_{c(l)} | M | e_{c(l)} \rangle$, where $|e_l\rangle$ are basis vectors.

Figure 3:
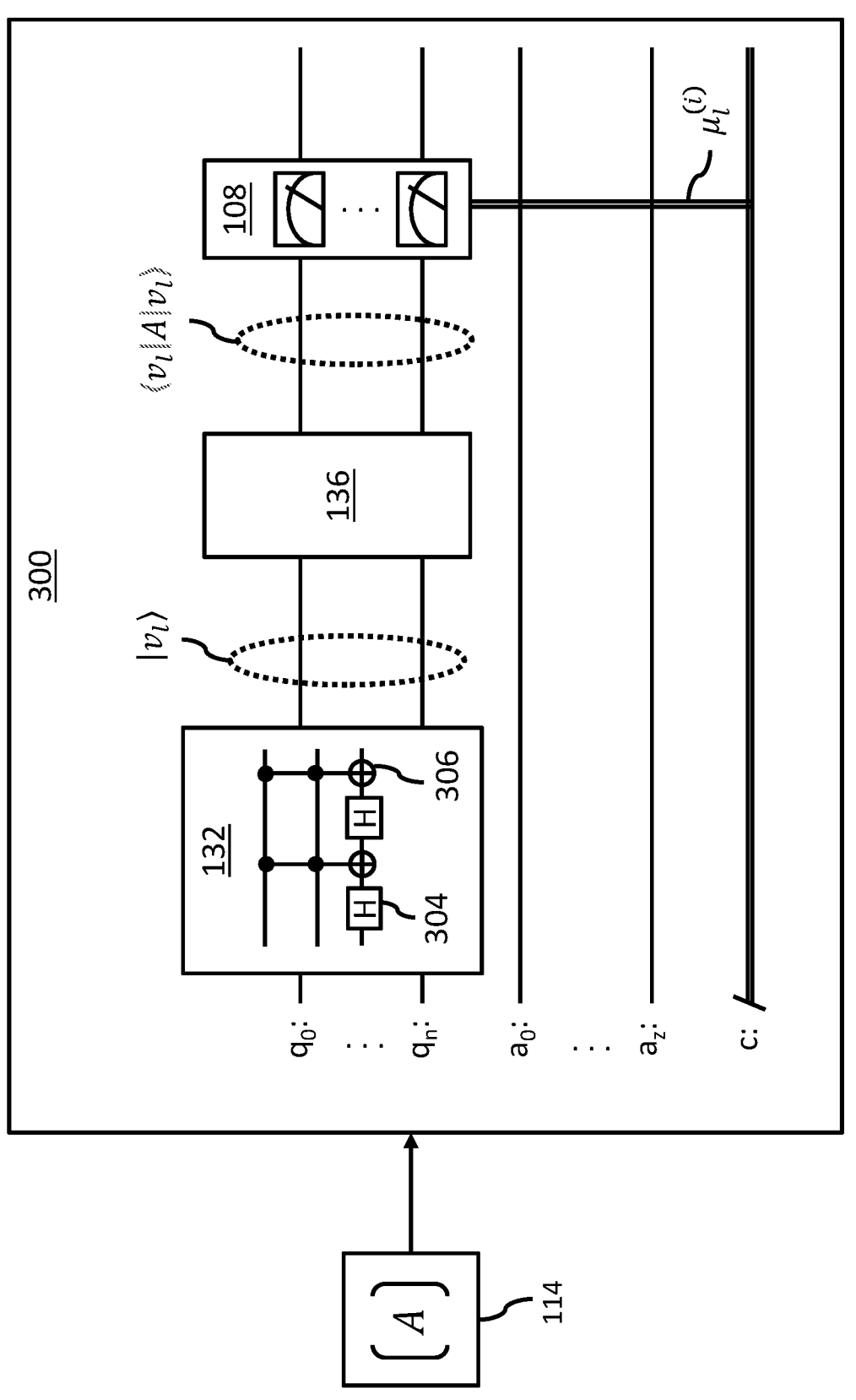
FIG. 3 is a diagram illustrating another example quantum circuit that can be implemented as quantum circuits for matrix trace estimation in one embodiment.

FIG. 3 is a diagram illustrating another example quantum circuit 300 that can be implemented as quantum circuits for matrix trace estimation in one embodiment. Quantum circuit 300 can be formed by quantum circuits 132, 136 and interface 108 as shown in FIG. 1. In one embodiment, quantum circuit 300 can receive input matrix 114 from classical system 101 (see FIG. 1). In embodiments where quantum circuit 300 is implemented for TDA applications, quantum circuit 134 (see FIG. 1) can be inserted between quantum circuits 132, 136 for generating the Laplacian $\Delta_k$ of dataset 110 instead of using input matrix A as input matrix 114. Quantum circuit 300 can operate on n qubits (e.g., $q_0, \ldots q_n$) and/or z ancilla qubits (e.g., $a_0, \ldots a_z$). Quantum circuit 300 can be implemented to estimate a trace of input matrix A. In the example shown in FIG. 3, quantum circuit 132 can be a quantum t-design circuit configured to generate random state vectors $|v_l\rangle$ by generating pseudo-random states. Quantum circuit 132, when implemented as a quantum t-design circuit, can include a set of Hadamard gates 304 and a set of Toffoli gates 306. The Hadamard gates 304 and the Toffoli gates 306 can form a set of Hadamard-Toffoli (HT) circuits that can output states that are indistinguishable from states drawn from a random Haar measure. An HT circuit can be a quantum circuit including a parallel layer of Hadamard gates followed by a circuit of Toffoli gates.

Figure 4:
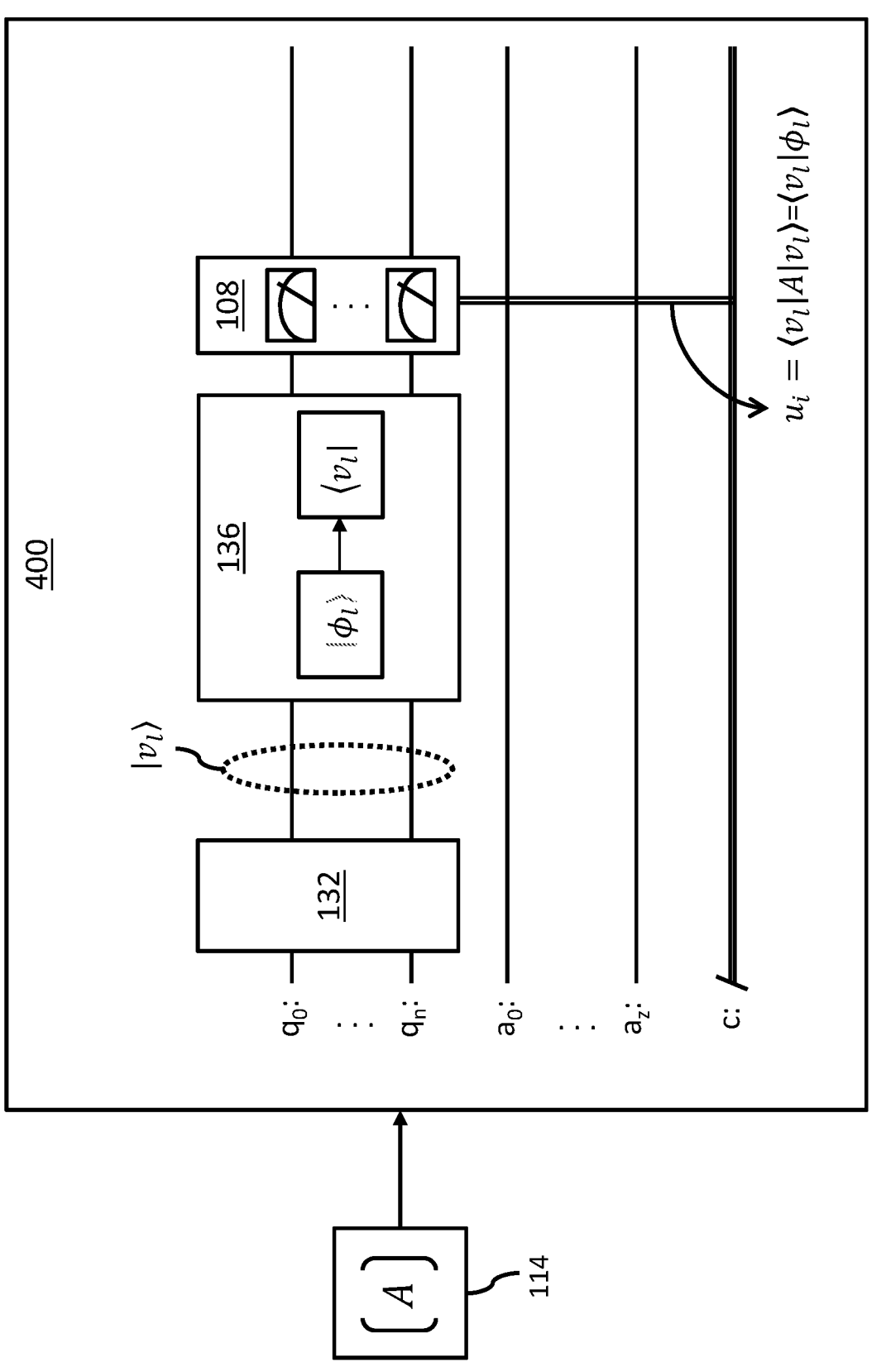
FIG. 4 is a diagram illustrating another example quantum circuit that can be implemented as quantum circuits for matrix trace estimation in one embodiment.

FIG. 4 is a diagram illustrating another example quantum circuit 400 that can be implemented as quantum circuits for matrix trace estimation in one embodiment. Quantum circuit 300 can be formed by quantum circuits 132, 136 and interface 108 as shown in FIG. 1. In one embodiment, quantum circuit 400 can receive input matrix 114 from classical system 101 (see FIG. 1). In embodiments where quantum circuit 400 is implemented for TDA applications, quantum circuit 134 (see FIG. 1) can be inserted between quantum circuits 132, 136 for generating the Laplacian $\Delta_k$ of dataset 110 instead of using input matrix A as input matrix 114. Quantum circuit 400 can operate on n qubits (e.g., $q_0, \ldots q_n$) and/or z ancilla qubits (e.g., $a_0, \ldots a_z$). Quantum circuit 400 can be implemented to estimate a trace of input matrix A. In the example shown in FIG. 4, quantum circuit 136 can be configured to determine the quantum state $|\phi_l\rangle = A|v_l\rangle$ and the inverse or conjugate transpose $\langle v_l | \phi_l \rangle$. In one embodiment, the conjugate transpose can be obtained by using an inverse of quantum circuit 136. Interface 108 can measure outputs from quantum circuit 136 to determine an inner product $\langle v_l | \phi_l \rangle$, which can be an estimation of the moments $u_l$.

Figure 5:
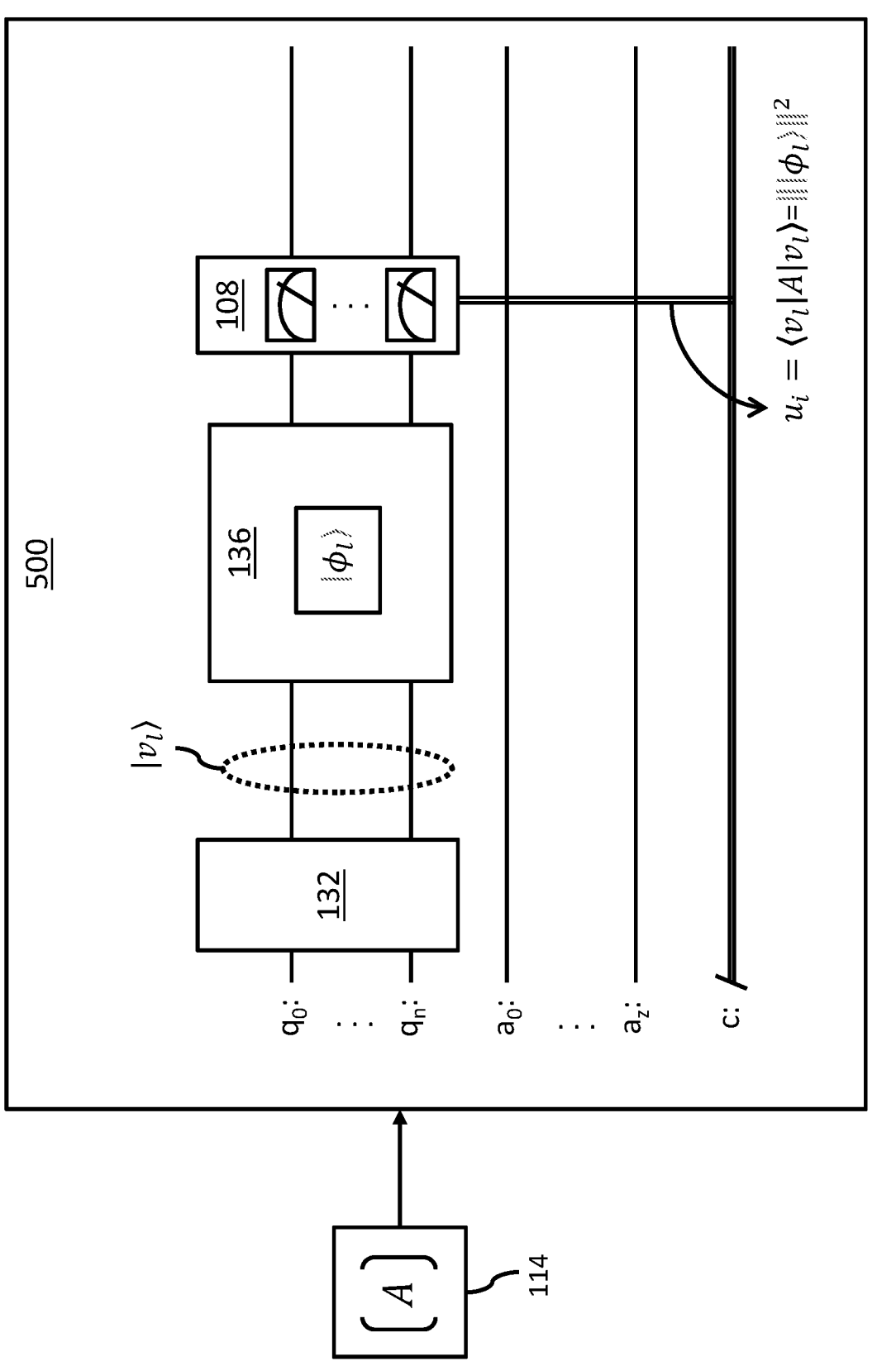
FIG. 5 is a diagram illustrating another example quantum circuit that can be implemented as quantum circuits for matrix trace estimation in one embodiment.

FIG. 5 is a diagram illustrating another example quantum circuit 500 that can be implemented as quantum circuits for matrix trace estimation in one embodiment. Quantum circuit 500 can be formed by quantum circuits 132, 136 and interface 108 as shown in FIG. 1. In one embodiment, quantum circuit 500 can receive input matrix 114 from classical system 101 (see FIG. 1). Quantum circuit 500 can be implemented for TDA applications, and quantum circuit 134 (see FIG. 1) can be inserted between quantum circuits 132, 136 for generating the Laplacian $\Delta_k$ of dataset 110 instead of using input matrix A as input matrix 114. Quantum circuit 500 can operate on n qubits (e.g., $q_0, \ldots q_n$) and/or z ancilla qubits (e.g., $a_0, \ldots a_z$). Quantum circuit 500 can be implemented to estimate a trace of the Laplacian $\Delta_k$. In the example shown in FIG. 5, quantum circuit 136 can be configured to determine the quantum state $|\phi_l\rangle$. Interface 108 can measure outputs (e.g., measure the norm $\||\phi_l\rangle\|^2$) from quantum circuit 136 to estimate the moments $u_i$, where the norm $\||\phi_l\rangle\|^2$ can be proportional to a square of the count register value c (e.g., probability of measuring a zero).

The circuit and computational complexities of the quantum circuits discussed herein can be NISQ implementable if there is efficient implementation of input matrix A. Further, sampling random state vectors with, for example, 4-wise independent entries, leads to utilization of log depth (relatively shorter) quantum circuits.

FIG. 6 is a flowchart of an example process 600 that may implement quantum circuits for matrix trace estimation according to an embodiment of the disclosure. Example process 600 may include one or more operations, actions, or functions as illustrated by one or more of blocks 602, 604, 606, 608, 610, and/or 612. Although illustrated as discrete blocks, various blocks can be divided into additional blocks, combined into fewer blocks, eliminated, performed in different order, or performed in parallel, depending on the desired implementation.

Process 600 can be implemented for operating a quantum system to estimate a trace of a matrix. Process 600 can begin at block 602. At block 602, a controller of a quantum system can receive an instruction. Process 600 can proceed from block 602 to block 604. At block 604, the controller of the quantum system can generate a command signal based on the instruction. Process 600 can proceed from block 604 to block 606. At block 606, an interface of the quantum system can convert the command signal into a quantum operation.

Process 600 can proceed from block 606 to block 608. At block 608, an interface of the quantum system can control quantum hardware of the quantum system to generate a random state vector represented by a plurality of qubits. The random state vector can include a specific number of independent entries. In one embodiment, the specific number of independent entries can be four entries. In one embodiment, the matrix can be a Hermitian matrix. Process 600 can proceed from block 608 to block 610. At block 610, an interface of the quantum system can determine moments of a matrix using based on the random state vector.

Process 600 can proceed from block 610 to block 612. At block 612, the controller of the quantum system can output the moments of the matrix to a computing device to estimate a trace of the matrix using the moments. In one embodiment, the matrix can correspond to a Laplacian of simplices of a specific order in a simplicial complex and a determination of Betti numbers of the simplicial complex can be based on the estimated trace. In one embodiment, the estimation of the trace can include determining an average of the moments over a number of samples used for the generation of the random state vector.

Figure 7:
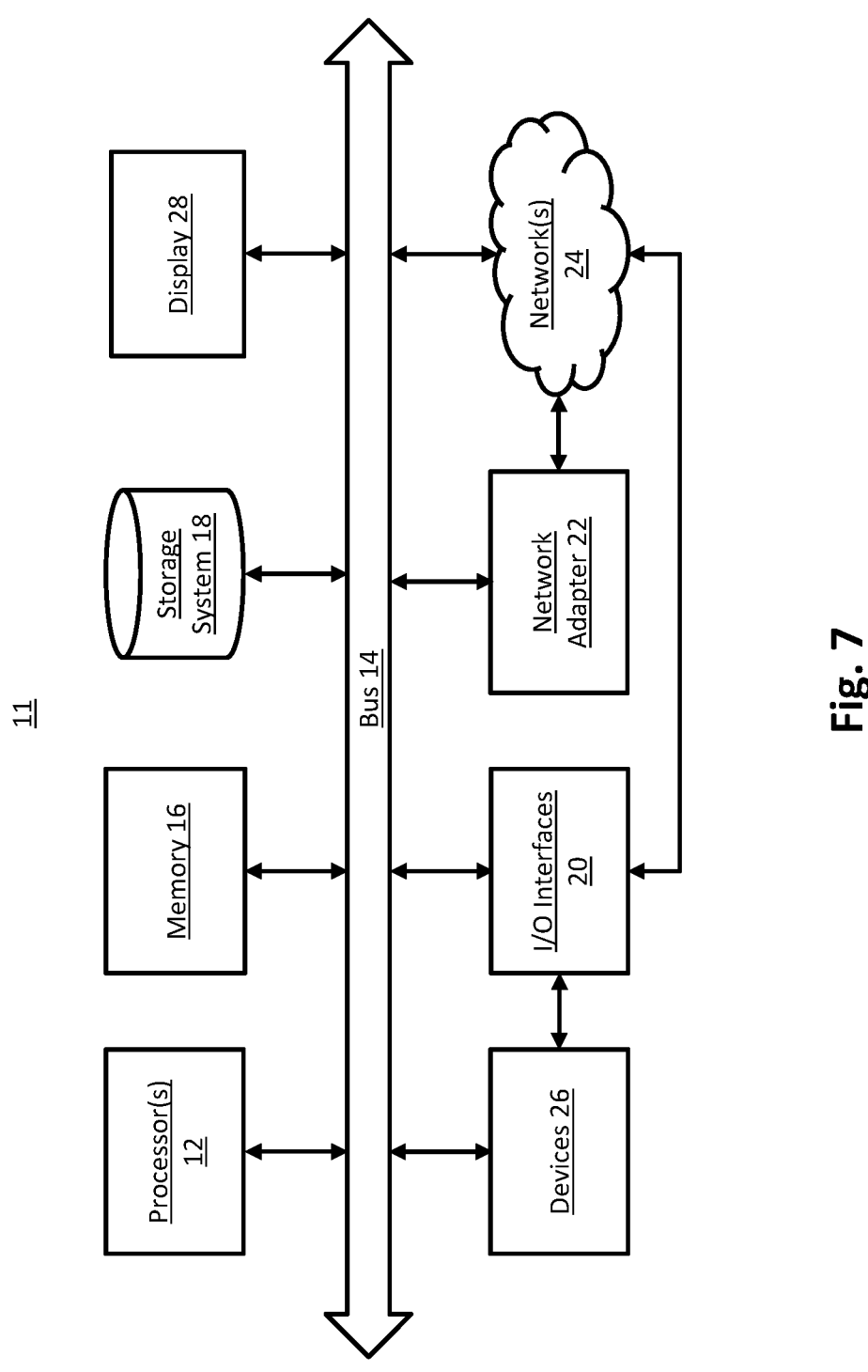
FIG. 7 illustrates a schematic of an example computer or processing system 11 that may implement quantum circuits for matrix trace estimation in one embodiment of the present disclosure.

FIG. 7 illustrates a schematic of an example computer or processing system 11 that may implement quantum circuits for matrix trace estimation in one embodiment of the present disclosure. The computer system 11 is an example of a suitable processing system and is not intended to suggest any limitation as to the scope of use or functionality of embodiments of the methodology described herein. The computer system 11 shown may be operational with numerous other general-purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, supercomputers, quantum computing systems, hybrid systems including quantum computers and classical computers, and distributed cloud computing environments that include any of the above systems or devices, and the like. Classical computers among computer system 11 can execute classical computing processes by performing operations based on information encoded in bits. Quantum computers among computer system 11 can execute quantum computing processes by performing operations based on information encoded in qubits.

The computer system 11 may be described in the general context of computer system executable instructions, such as program modules, being implemented by a computer system. Generally, program modules may include routines, programs, objects, components, logic, data structures, and so on that perform particular tasks or implement particular abstract data types. The computer system 11 may be practiced in distributed cloud computing environments where tasks are performed by remote processing devices that are linked through a communications network. In a distributed cloud computing environment, program modules may be located in both local and remote computer system storage media including memory storage devices.

The components of computer system 11 may include, but are not limited to, one or more processors or processing units 12, a system memory 16, a bus 14, storage system(s) 18, I/O interface(s) 20, network adapter(s) 22, network 24, devices 26, and display(s) 28. Bus 14 may couple various components of computer system 10. The processor 12 may include modules (e.g., programming modules) that performs the methods described herein. The modules among processor 12 may be programmed into the integrated circuits of the processor 12, or loaded from memory 16, storage device 18, or network 24 or combinations thereof. Processor 12 can be, for example, a microprocessor, a microcontroller, a processor core, a multicore processor, central processing unit (CPU) of computing devices such as a classical computer and/or quantum computers, and/or other types of computer processing element.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Universal Serial Bus (USB), Video Electronics Standards Association (VESA) local bus, and Peripheral Component Interconnects (PCI) bus.

Computer system 11 may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system 11 may also communicate with one or more external devices 26 such as a keyboard, a pointing device, a display 28, network card, modem, etc. that enable a user to interact with computer system and/or that enable computer system 11 to communicate with one or more other computing devices. Devices 26 can be connected to components among computer system 11 via bus 14 and/or input/output (I/O) interfaces 20.

Computer system 11 can communicate with one or more networks 24 such as a local area network (LAN), a general wide area network (WAN), and/or a public network (e.g., the Internet) via network adapter 22 and/or I/O interfaces 20. Computer system 11 can communicate with networks 24 through wired connections (e.g., wires or cables connected to bus 14) or wireless connections (e.g., through network cards among I/O devices 20 and/or network adapter 22).

Network adapter 22 can communicate with the other components of computer system 11 via bus 14. It should be understood that although not shown, other hardware and/or software components could be used in conjunction with computer system 10. Examples include, but are not limited to: field-programmable gate array (FPGA), system on chip (SoC), microcode, device drivers, redundant processing units, external disk drive arrays, RAID systems, tape drives, and data archival storage systems, etc.

Figure 8:
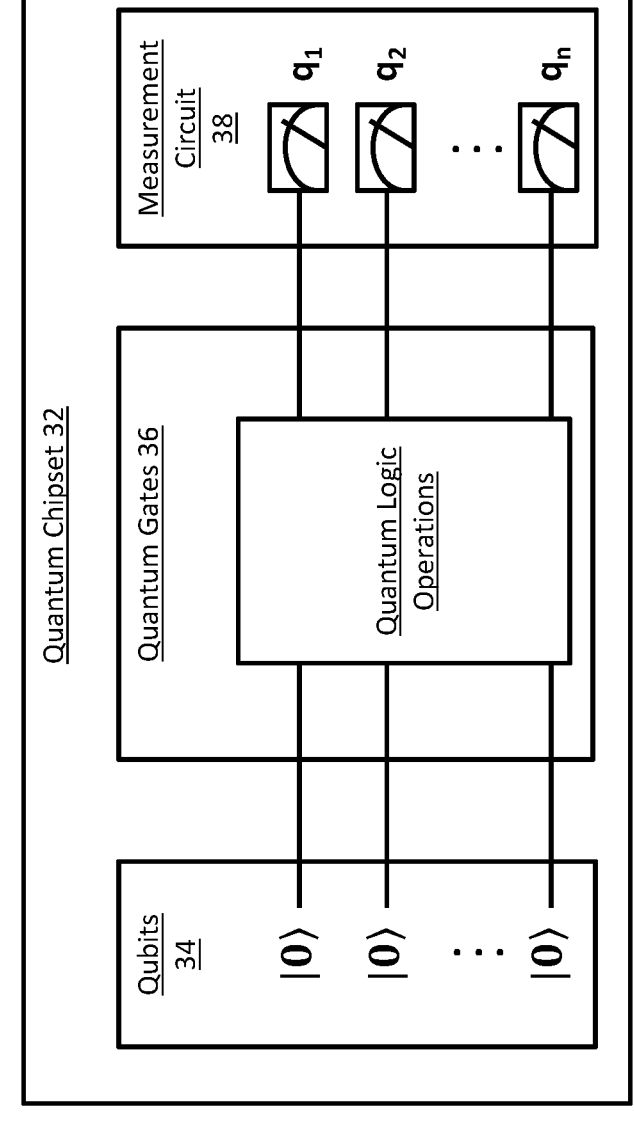
FIG. 8 illustrates a schematic of an example quantum computing system 30 that may implement quantum circuits for matrix trace estimation in one embodiment of the present disclosure.

FIG. 8 illustrates a schematic of an example quantum computing system 30 that may implement quantum circuits for matrix trace estimation in one embodiment of the present disclosure. Quantum computing system 30 can be implemented by a quantum computer among processor 12 shown in FIG. 7, or coupled to network 24 shown in FIG. 7). Quantum computing system 30 can include a quantum chipset 32. Quantum chipset 32 can include one or more components configured to operate on qubits. Quantum chipset 32 can be a quantum computing core surrounded by an infrastructure to shield quantum chipset 32 from sources of electromagnetic noise, mechanical vibration, heat, and other sources of noise, which tend to degrade performance. For example, an infrastructure that can surround quantum chipset 32 can be a refrigerator that can cool the quantum chipset to an operating temperature of quantum chipset 32.

Quantum chipset 32 can include a quantum register 34, quantum gates 36 and measurement interface 38. Quantum register 34 can store a plurality of qubits $q_1, q_2, \ldots, q_n$. Quantum chipset 32 can operate by performing quantum logic operations (e.g., using quantum gates 36) on qubits stored in quantum register 34. Quantum gates 36 can include one or more single-qubit gates and/or two-qubit gates. Measurement interface 38 can include circuit components configured to measure a basis of a plurality of qubits $q_1, q_2, \ldots, q_a$, where the basis is a measurement that will yield a classical bit result. Measurements performed by measurement interface 38 can be probabilistic, and can be read out to a device (e.g., a classical computer) connected to quantum computing system 30.

Figure 9:
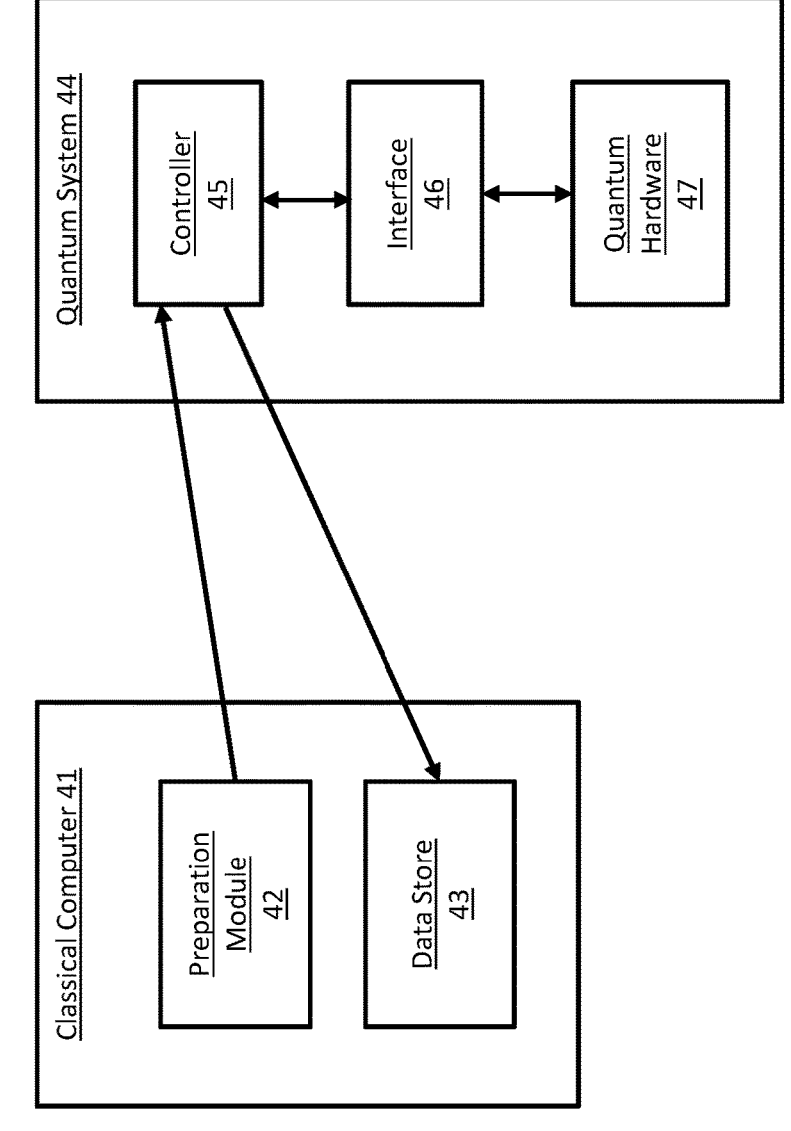
FIG. 9 illustrates a block diagram of an example system that can facilitate execution of a quantum algorithm in one embodiment of the present disclosure.

FIG. 9 illustrates a block diagram of an example system 40 that can facilitate execution of a quantum algorithm. As shown, a classical computer 41 can be electronically integrated, via any suitable wired and/or wireless electronic connection, with a quantum system 44. The quantum system 44 can be any suitable set of components capable of performing quantum operations on a physical system. In the example embodiment depicted in FIG. 9, quantum system 44 can include controller 45 (e.g., a local classical controller), an interface 46 (e.g., a classical-quantum interface), and quantum hardware 47. In some embodiments, all or part of each of the controller 45, the interface 46, and quantum hardware 47 may be located in a cryogenic environment to aid in the performance of the quantum operations.

Controller 45 may be any combination of digital computing devices capable of performing a quantum computation, such as executing a quantum circuit, in combination with interface 46. Such digital computing devices may include digital processors and memory for storing and executing quantum commands using interface 46. Additionally, such digital computing devices may include devices having communication protocols for receiving such commands and sending results of the performed quantum computations to classical computer 41. Additionally, the digital computing devices may include communications interfaces with the interface 46. Controller 45 can be configured to receive classical instructions (e.g., from classical computer 41) and convert the classical instructions into drive signals. The drive signals can be used for driving or manipulating qubits and/or quantum gates and/or circuits among quantum hardware 47.

Interface 46 may be a combination of devices capable of receiving command signals from controller 45 and converting those signals into quantum operations for execution on the quantum hardware 47. Additionally, interface 46 may be capable of converting signals received from the quantum hardware 47 into digital signals capable of processing and transmitting by controller 45. Devices included in interface 46 may include, but are not limited to, digital-to-analog converters, analog-to-digital converters, waveform generators, attenuators, amplifiers, optical fibers, lasers, and filters.

Quantum hardware 47 may be any hardware capable of using quantum states to process information. Such hardware may include a collection of qubits, and mechanisms to couple/entangle such qubits, in order to process information using said quantum states. Such qubits may include, but are not limited to, charge qubits, flux qubits, phase qubits, spin qubits, and trapped ion qubits.

The classical computer 41 can be any suitable combination of computer-executable hardware and/or computer-executable software capable of executing a preparation module 42 to perform quantum computations with data contained in a data store 43 as part of building and implementing a machine learning protocol. Data store 43 may be a repository for data to be analyzed using a quantum computing algorithm, as well as the results of such analysis. In an example system, classical computer 41 can be a laptop computer, a desktop computer, a vehicle-integrated computer, a smart mobile device, a tablet device, and/or any other suitable classical computing device. Additionally or alternatively, classical computer 41 may also operate as part of a cloud computing service model, such as Software as a Service (SaaS), Platform as a Service (PaaS), or Infrastructure as a Service (IaaS). Classical computer 102 may also be located in a cloud computing deployment model, such as a private cloud, community cloud, public cloud, or hybrid cloud. Aspects of this embodiment are described in more detail below with reference to FIG. 10 and FIG. 11.

Preparation module 42 may be a program or module capable of preparing classical data from data store 43 to be analyzed as part of the implementation of a quantum circuit. Preparation module 42 may be instantiated as part of a larger algorithm, such as a function call of an application programming interface (API) or by parsing a hybrid classical-quantum computation into aspects for quantum and classical calculation. Preparation module 42 may generate instructions for creating a quantum circuit using quantum gates in quantum hardware 47. In an embodiment, such instructions may be stored by controller 41, and may instantiate the execution of the components of interface 46 so that the quantum operations of the quantum gates may be executed on quantum hardware 47.

Figure 10:
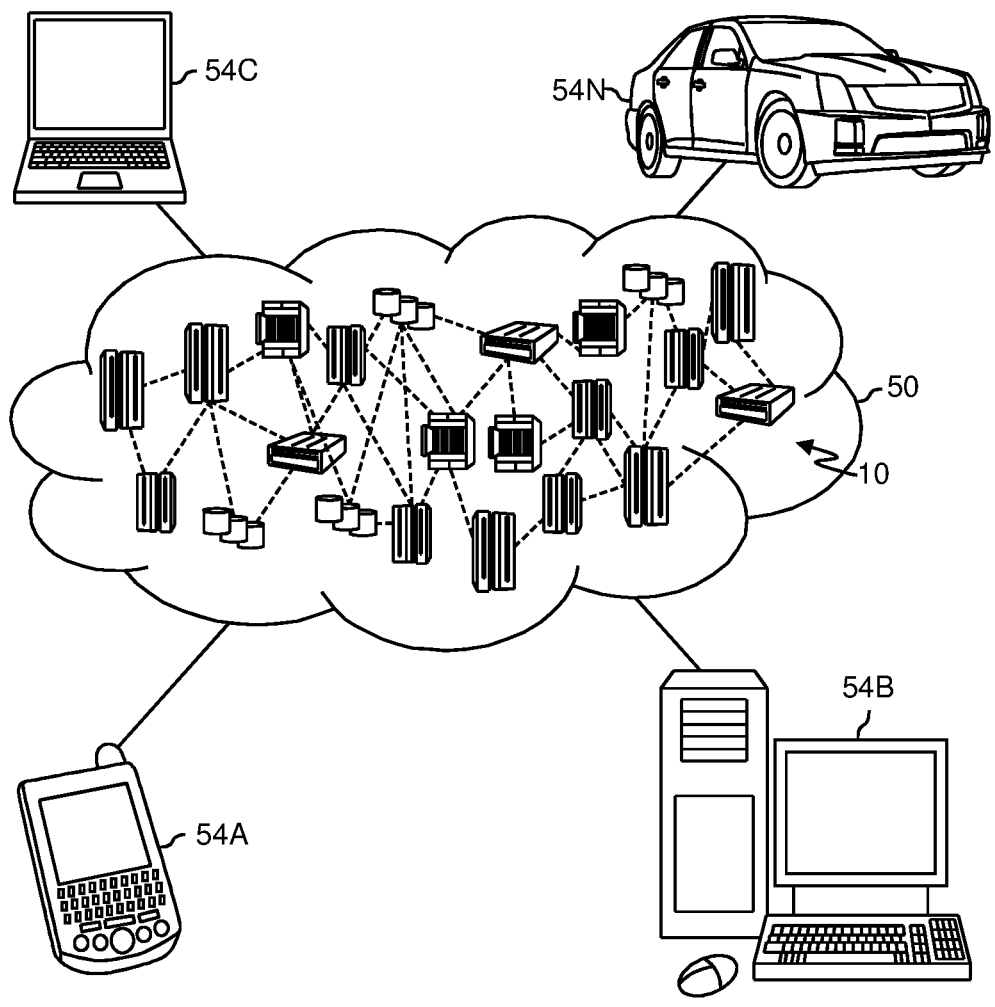
FIG. 10 depicts a cloud computing environment according to an embodiment of the present invention.

FIG. 10 depicts a cloud computing environment according to an embodiment of the present invention. It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 10, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
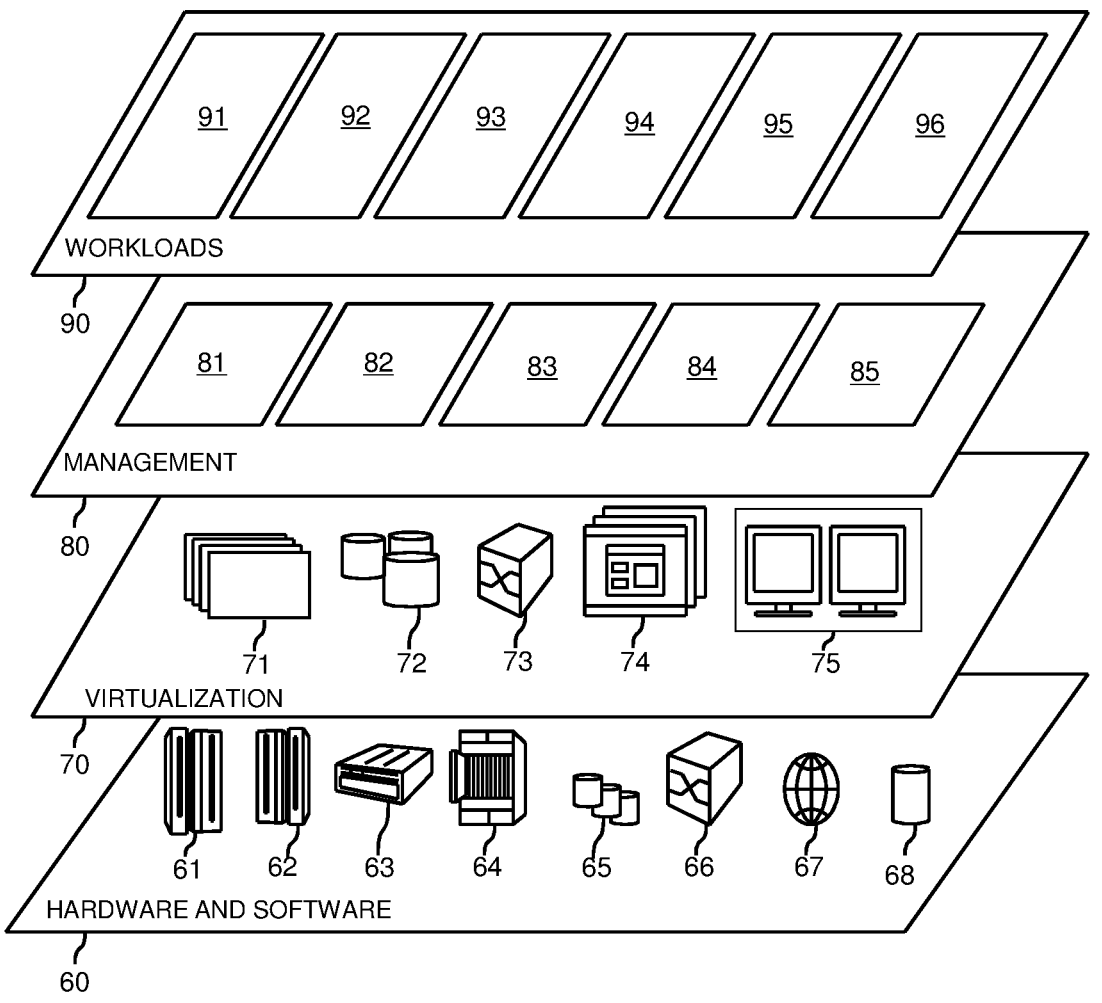
FIG. 11 depicts abstraction model layers according to an embodiment of the present invention.

FIG. 11 depicts abstraction model layers according to an embodiment of the present invention. Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and matrix trace estimation 96.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more instructions for implementing the specified logical function(s). In some alternative implementations, the functions noted in the blocks may occur out of the order noted in the Figures. For example, two blocks shown in succession may, in fact, be performed substantially concurrently, or the blocks may sometimes be performed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
a controller configured to generate a command signal;
quantum hardware including at least a first set of qubits, a second set of qubits, and a plurality of Hadamard gates; and
an interface connected to the controller and the quantum hardware, the interface being configured to convert the command signal received from the controller into a quantum operation to control the quantum hardware to:
generate a random state vector represented by a plurality of qubits, wherein the random state vector comprises a specific number of independent entries of independent states of the random state vector, and the random state vector is a superposition of multiple states of the random state vector having different Hamming weights;
determine moments of a matrix based on the random state vector, wherein elements of the matrix are inaccessible to the apparatus; and
the controller being further configured to output the moments of the matrix to a computing device to estimate a trace of the matrix using the moments.

2. The apparatus of claim 1, wherein the specific number of independent entries is four entries.

3. The apparatus of claim 1, wherein the matrix corresponds to a Laplacian of simplices of a specific order in a simplicial complex, and a determination of Betti numbers of the simplicial complex is based on the estimated trace.

4. The apparatus of claim 1, wherein the matrix is a Hermitian matrix.

5. The apparatus of claim 1, wherein the matrix is an $n \times n$ matrix representing a dataset of n data points.

6. The apparatus of claim 1, wherein the matrix is an $n \times n$ matrix, and the quantum circuit is configured to generate the random state vector by randomly sampling a column of a $2^n \times 2^n$ Hadamard matrix.

7. The apparatus of claim 1, wherein the quantum hardware comprises a quantum t-design circuit including a layer of parallel Hadamard gates followed by a set of Toffoli gates, the interface is configured to control the quantum t-design circuit to output pseudo-random states that are indistinguishable from states drawn from a random Haar measure to sample the random state vector.

8. The apparatus of claim 1, wherein the interface is configured to control the quantum hardware to:
determine a quantum state that represents an application of the matrix to the random state vector;
determine a complex conjugate of the random state vector; and
determine an inner product between the quantum state and the complex conjugate to determine the moments.

9. The apparatus of claim 1, wherein the matrix corresponds to a Laplacian of simplices of a specific order in a simplicial complex, and the quantum circuit is configured to:
determine a quantum state that represents an application of the Laplacian to the random state vector; and
determine a norm of the quantum state to determine the moments.

10. The apparatus of claim 1, wherein estimation of the trace comprises averaging the moments over a number of samples used for generating the random state vector.

11. A system comprising:
a first computing device configured to process data encoded in binary data;
a second computing device configured to be in communication with the first computing device, the second computing device being configured to process data encoded in qubits, the second computing device comprises:

a controller configured to generate a command signal;

quantum hardware including at least a first set of qubits, a second set of qubits, and a plurality of Hadamard gates; and an interface connected to the controller and the quantum hardware, the interface being configured to convert the command signal received from the controller into a quantum operation to control the quantum hardware to:

generate a random state vector represented by a plurality of qubits, wherein the random state vector comprises a specific number of independent entries of independent states of the random state vector, and the random state vector is a superposition of multiple states of the random state vector having different Hamming weights;

determine moments of a matrix based on the random state vector, wherein elements of the matrix are inaccessible to the apparatus; and the controller being further configured to output the moments of the matrix to the first computing device to estimate a trace of the matrix using the moments.

12. The system of claim 11, wherein the specific number of independent entries is four entries.

13. The system of claim 11, wherein the matrix corresponds to a Laplacian of simplices of a specific order in a simplicial complex, and a determination of Betti numbers of the simplicial complex is based on the estimated trace.

14. The system of claim 11, wherein the matrix is a Hermitian matrix.

15. The system of claim 11, wherein the matrix is an n×n matrix representing a dataset of n data points.

16. The system of claim 11, wherein the matrix is an n×n matrix, and the quantum circuit is configured to generate the random state vector by randomly sampling a column of a $2^n \times 2^n$ Hadamard matrix.

17. The system of claim 11, wherein the second computing device comprises a quantum t-design circuit including a layer of parallel Hadamard gates followed by a set of Toffoli gates, and the interface is configured to control the quantum t-design circuit to output pseudo-random states that are indistinguishable from states drawn from a random Haar measure to sample the random state vector.

18. The system of claim 11, wherein the second computing device is configured to:

determine a quantum state that represents an application of the matrix to the random state vector;

determine a complex conjugate of the random state vector; and determine an inner product between the quantum state and the complex conjugate to determine the moments.

19. The system of claim 11, wherein the matrix corresponds to a Laplacian of simplices of a specific order in a simplicial complex, and the second computing device is configured to:

determine a quantum state that represents an application of the Laplacian to the random state vector; and determine a norm of the quantum state to determine the moments.

20. The system of claim 11, wherein the first computing device is configured to determine an average of the moments over a number of samples used for the generation of the random state vector to estimate the trace.

21. A method of operating a quantum system, the method comprising:

receiving, by a controller of a quantum system, an instruction;

generating, by the controller of the quantum system, a command signal based on the instruction;

converting, by an interface of the quantum system, the command signal into a quantum operation; and based on the quantum operation, controlling, by the interface of the quantum system, quantum hardware of the quantum system including a plurality of Hadamard gates to:

generate a random state vector represented by a plurality of qubits, the random state vector comprising a specific number of independent entries of independent states of the random state vector, and the random state vector is a superposition of multiple states of the random state vector having different Hamming weights;

determine moments of a matrix based on the random state vector, wherein elements of the matrix are inaccessible to the apparatus; and outputting, by the controller of the quantum system, the moments of the matrix to a computing device to estimate a trace of the matrix using the moments.

22. The method of claim 21 wherein the specific number of independent entries is four entries.

23. The method of claim 21, wherein the matrix corresponds to a Laplacian of simplices of a specific order in a simplicial complex, and a determination of Betti numbers of the simplicial complex is based on the estimated trace.

24. The method of claim 21, wherein an estimation of the trace comprises determining an average of the moments over a number of samples used for the generation of the random state vector.

25. The method of claim 21, wherein the matrix is a Hermitian matrix.

* * * * *